(12) United States Patent
Miller et al.

(10) Patent No.: US 10,619,742 B2
(45) Date of Patent: Apr. 14, 2020

(54) RING SEAL ARRANGEMENT WITH INSTALLATION FOOLPROOFING

(71) Applicant: United Technologies Corporation, Farmington, CT (US)

(72) Inventors: Jonathan Logan Miller, Ware, MA (US); Joseph G. Colucci, Milford, CT (US); Colin D. Craig, West Hartford, CT (US); Aneil S. Hegde, Mansfield Center, CT (US); Michael M. Davis, North Granby, CT (US)

(73) Assignee: United Technologies Corporation, Farmington, CT (US)

(*) Notice: Subject to any disclaimer, the term of this patent is extended or adjusted under 35 U.S.C. 154(b) by 0 days.

(21) Appl. No.: 15/650,171

(22) Filed: Jul. 14, 2017

(65) Prior Publication Data
US 2019/0017605 A1    Jan. 17, 2019

(51) Int. Cl.
*F01D 11/00* (2006.01)
*F16J 15/3296* (2016.01)
(Continued)

(52) U.S. Cl.
CPC ......... *F16J 15/3296* (2013.01); *F01D 11/003* (2013.01); *F01D 25/183* (2013.01);
(Continued)

(58) Field of Classification Search
CPC .. F16J 15/3484; F16J 15/3496; F16J 15/3468; F16J 15/441; F16J 15/442; F02C 7/28; F01D 25/183
See application file for complete search history.

(56) References Cited

U.S. PATENT DOCUMENTS 4,211,424 A * 7/1980 Stein ................. F01D 11/003
                                                    277/352
4,289,322 A * 9/1981 Traversari ............. F16J 15/441
                                                    277/546
(Continued)

FOREIGN PATENT DOCUMENTS

EP    3048342 A1    7/2016
EP    3048343 A1    7/2016
(Continued)

OTHER PUBLICATIONS

Extended European Search Report for EP Application No. 18183782.4, dated Jan. 21, 2019, pp. 12.
(Continued)

*Primary Examiner* — Eugene G Byrd
(74) *Attorney, Agent, or Firm* — Kinney & Lange, P.A.

(57) ABSTRACT

A ring seal in a gas turbine engine includes a ring seal body, an axial sealing dam, a radial sealing dam, and at least one bleed slot. The ring seal body is annular in shape and has a first axial side, a second axial side, a radially outer side, and a radially inner side. The axial sealing dam is on the first axial side and is configured to provide a first sealing surface with a first component. The radial sealing dam is on the radially outer side and is configured to provide a second sealing surface with a second component radially outward from the radially outer side. The at least one bleed slot is on the second axial side and configured to allow fluid to pass through when the ring seal is incorrectly oriented such that the at least one bleed slot is adjacent to the first component.

20 Claims, 5 Drawing Sheets

(51) Int. Cl.
*F16J 15/3268* (2016.01)
*F01D 25/18* (2006.01)
*F16J 15/34* (2006.01)
*F16J 15/44* (2006.01)
*F02C 7/28* (2006.01)

(52) U.S. Cl.
CPC ........ *F01D 25/186* (2013.01); *F16J 15/3268* (2013.01); *F16J 15/3488* (2013.01); *F16J 15/441* (2013.01); *F02C 7/28* (2013.01)

(56) References Cited

U.S. PATENT DOCUMENTS

| | | | | |
|---|---|---|---|---|
| 5,169,159 | A * | 12/1992 | Pope | F16J 15/441 |
| | | | | 277/422 |
| 5,518,256 | A * | 5/1996 | Gaffal | F16J 15/441 |
| | | | | 277/414 |
| 5,558,341 | A * | 9/1996 | McNickle | F16J 15/3488 |
| | | | | 277/400 |
| 8,905,407 | B2 | 12/2014 | Ruggeri et al. | |
| 9,638,326 | B2 | 5/2017 | Haynes | |
| 2007/0085278 | A1 * | 4/2007 | Davis | F01D 25/183 |
| | | | | 277/411 |
| 2010/0143114 | A1 * | 6/2010 | Purdey | F01D 11/001 |
| | | | | 415/230 |
| 2012/0304854 | A1 * | 12/2012 | Hold | B23P 15/06 |
| | | | | 92/172 |
| 2013/0285331 | A1 * | 10/2013 | Kostka | F01D 11/003 |
| | | | | 277/411 |
| 2015/0049968 | A1 * | 2/2015 | Garrison | F16C 32/0607 |
| | | | | 384/115 |
| 2016/0010483 | A1 * | 1/2016 | Miller | F01D 11/003 |
| | | | | 277/543 |
| 2016/0116066 | A1 * | 4/2016 | Watanabe | F16J 9/14 |
| | | | | 277/500 |
| 2016/0169389 | A1 * | 6/2016 | Haynes | F16J 15/26 |
| | | | | 277/544 |
| 2016/0208710 | A1 * | 7/2016 | Miller | F02C 7/28 |

FOREIGN PATENT DOCUMENTS

| | | | | |
|---|---|---|---|---|
| JP | | 05195816 A | * 8/1993 | ............. F16J 15/441 |
| JP | | 2010223332 A | * 10/2010 | ........... F16J 15/3484 |
| WO | WO 2014158294 A2 | | 10/2014 | |

OTHER PUBLICATIONS

Extended European Search Report for EP Application No. 18183782.4, dated Oct. 17, 2018, 13 pages.

* cited by examiner

RING SEAL ARRANGEMENT WITH INSTALLATION FOOLPROOFING

BACKGROUND

The present invention relates to seals in a gas turbine engine and, in particular, to a ring seal arrangement with installation foolproofing in a gas turbine engine.

In general, gas turbine engines combust a mixture of compressed air and fuel to produce hot combustion gases. The combustion gases may flow through one or more turbine stages to generate power for a load and/or compressor before being expelled at the exhaust section of the gas turbine engine. The combination of hot gases and high pressures can cause stress and wear on components in the exhaust section. To reduce the stress and wear, lubricant (such as oil) is present in a contained lubricant compartment (such as a compartment within the exhaust section). With a radially inner side of the compartment being attached to the rotating shaft of the gas turbine engine, ring seals or other types of seal arrangement are needed to minimize leakage of higher pressure fluid into the lubricant compartment and minimize loss of lubricant out of the compartment. Seal arrangements must be installed correctly to increase axial loading, limit wear damage to the seal arrangement and gas turbine engine, and ensure lubricant cannot leak out of the compartment.

SUMMARY

One embodiment of a ring seal for sealing between components in a gas turbine engine includes a ring seal body, an axial sealing dam, a radial sealing dam, and at least one bleed slot. The ring seal body is annular in shape and has a first axial side, a second axial side, a radially outer side, and a radially inner side. The axial sealing dam is on the first axial side and is configured to provide a first sealing surface between the ring seal and a first component. The radial sealing dam is on the radially outer side and is configured to provide a second sealing surface between the ring seal and a second component radially outward from the radially outer side. The at least one bleed slot is on the second axial side and configured to allow air to pass through the at least one bleed slot when the ring seal is incorrectly oriented such that the at least one bleed slot is adjacent to the first component.

Another embodiment of a ring seal arrangement includes a static liner, a front spacer, a rear spacer, a forward ring seal, an aft ring seal, and a resilient member. The static liner is annular in shape, extends axially along a center axis, and is configured to be nonrotatable. The front spacer is radially inward from the static liner and is configured to be rotatable relative to the static liner. The rear spacer is radially inward from the static liner, axially downstream from the front spacer, and configured to be rotatable relative to the static liner. The forward ring seal is annular in shape with a forward sealing dam adjacent to the front spacer, an outer sealing dam adjacent to the static liner, and at least one bleed slot on an aft side with the at least one bleed slot configured to allow air to flow between the front spacer and the forward ring seal when the forward ring seal is installed in an incorrect orientation when the aft side is adjacent to the forward spacer. The aft ring seal is annular in shape with a rear sealing dam adjacent to the rear spacer, an outer sealing dam adjacent to the static liner, and at least one bleed slot on a forward side with the at least one bleed slot configured to allow air to flow between the rear spacer and the aft ring seal when the aft ring seal is installed in an incorrect orientation when the forward side is adjacent to the rear spacer. The resilient member is positioned between the forward ring seal and the aft ring seal.

A method of testing a ring seal arrangement having a first side and a second side includes increasing a pressure of air on the second side of the ring seal arrangement to be greater than a pressure of air on the first side of the ring seal arrangement. The ring seal arrangement includes a forward ring seal configured to form a seal with the first side and having at least one bleed slot configured to allow air to flow between the first side and the second side when the forward ring seal is installed in an incorrect orientation and an aft ring seal configured to form a seal with the second side and having at least one bleed slot configured to allow air to flow between the first side and the second side when the aft ring seal is installed in an incorrect orientation. The method also includes measuring a change in pressure of air on the second side of the ring seal arrangement, and determining if one or both of the forward ring seal and the aft ring seal is in the incorrect orientation based on the change in pressure of air on the second side of the ring seal arrangement.

DETAILED DESCRIPTION

A ring seal arrangement with foolproofing (i.e., mistakeproofing) capabilities in a gas turbine engine is disclosed herein that includes bleed slots that extend through a ring seal to allow air to leak through the ring seal if the ring seal is installed in an incorrect orientation, thus allowing the ring seal arrangement to fail an air leakage pressure test during the assembly process and before the ring seal arrangement is put into operation. Because of the geometry of the ring seal, it would be unlikely that the air pressure leakage test would reveal that the ring seal is incorrectly installed without the foolproofing bleed slots. Without the bleed slots, an incorrectly installed ring seal could end up in operation, which would result in increased seal wear, a shorter life cycle, and reduced product reliability.

Figure 1:
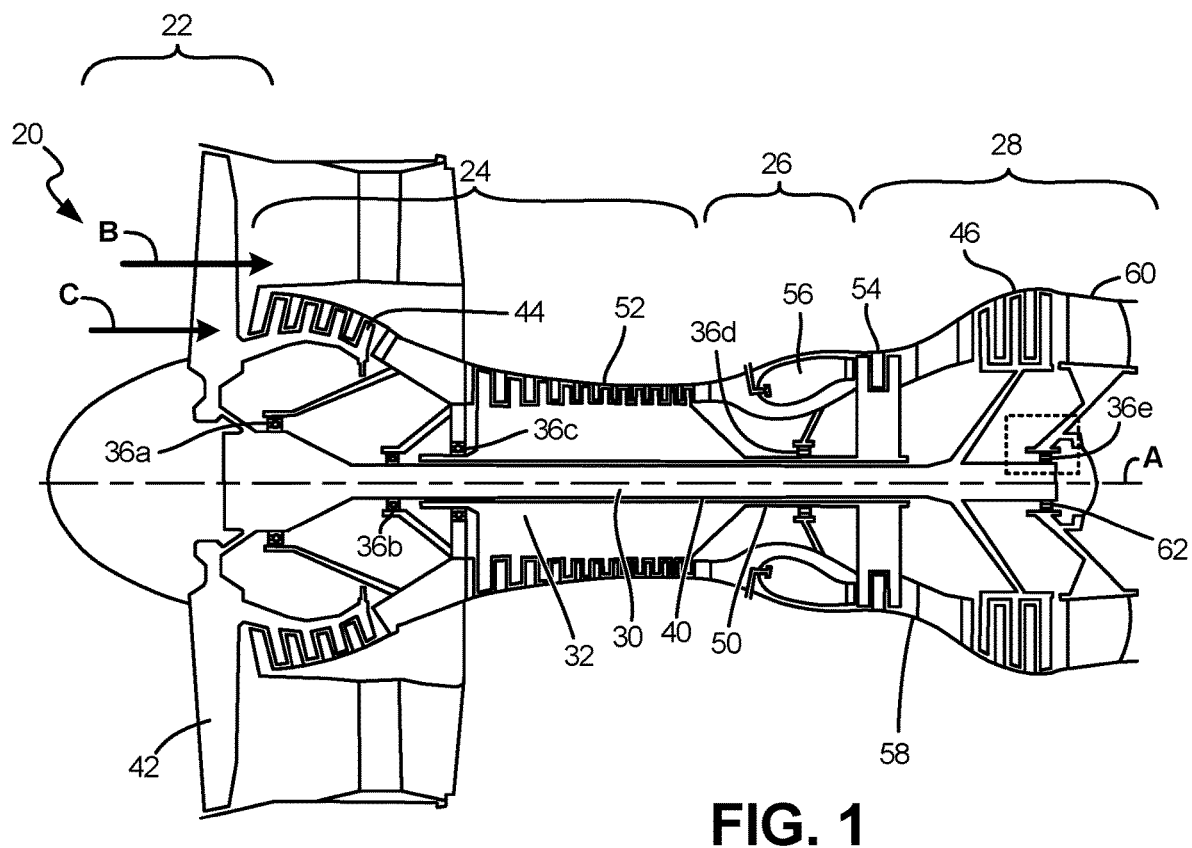
FIG. 1 is a cross-sectional view of a gas turbine engine.

FIG. 1 is a cross-sectional view of an example gas turbine engine 20. Gas turbine engine 20 includes fan section 22, compressor section 24, combustor section 26, and turbine section 28. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a gas turbine engine, it should be understood that the concepts described herein are not limited to use with gas turbine engines as the teachings may be applied to other types of machines. Further, while this disclosure details the use of a ring seal arrangement with installation foolproofing in a turbine exhaust section of a gas turbine engine, the configuration described herein can be utilized in other sections of the gas turbine engine. It should be further understood that the disclosed nonlimiting embodiment provides generally a flow metering and retention system that is suitable for many types of rotating or rotary machines as known to those of ordinary skill in the art.

The example gas turbine engine 20 generally includes low speed spool 30 and high speed spool 32 mounted for rotation about center axis A of gas turbine engine 20 via several bearing assemblies 36 (separately illustrated as 36a, 36b, 36c, 36d, and 36e). It should be understood that various bearing assemblies 36 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as a geared architecture, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 (collectively shaft 34) are concentric and rotate via various bearing assemblies 36 about center axis A. The various bearing assemblies 36 include forward low speed bearing 36a, mid-shaft bearing 36b, forward high speed bearing 36c, rear high speed bearing 36d, and rear low speed bearing 36e.

Combustor 56 is arranged between high pressure compressor section 52 and high pressure turbine section 54. Mid-turbine frame 58 can be arranged generally between high pressure turbine section 54 and low pressure turbine section 46. Mid-turbine frame 58 further supports bearing assemblies 36 in turbine section 28 as well as settling airflow entering low pressure turbine section 46.

Core airflow C is compressed first by low pressure compressor 44 and then by high pressure compressor section 52, mixed with fuel and ignited in combustor 56 to produce high speed exhaust gases, and then expanded through high pressure turbine section 54 and low pressure turbine section 46 before exiting turbine section 28 at turbine exhaust section 60. As inner shaft 40 and outer shaft 50 rotate about center axis A and combustor 56 ignites core airflow C, turbine section 28 can experience high temperatures due to the high rotating speed of inner shaft 40 and outer shaft 50 as well as the high temperature of core airflow C. Lubricant, such as oil, may be utilized within turbine section 28, and more specifically at turbine exhaust section 60, to provide cooling to the components within turbine exhaust section 60. To minimize wear and seal the lubricant off from other components within turbine exhaust section 60, ring seal arrangement 62 as described in FIGS. 2-5 may be utilized.

Figure 2:
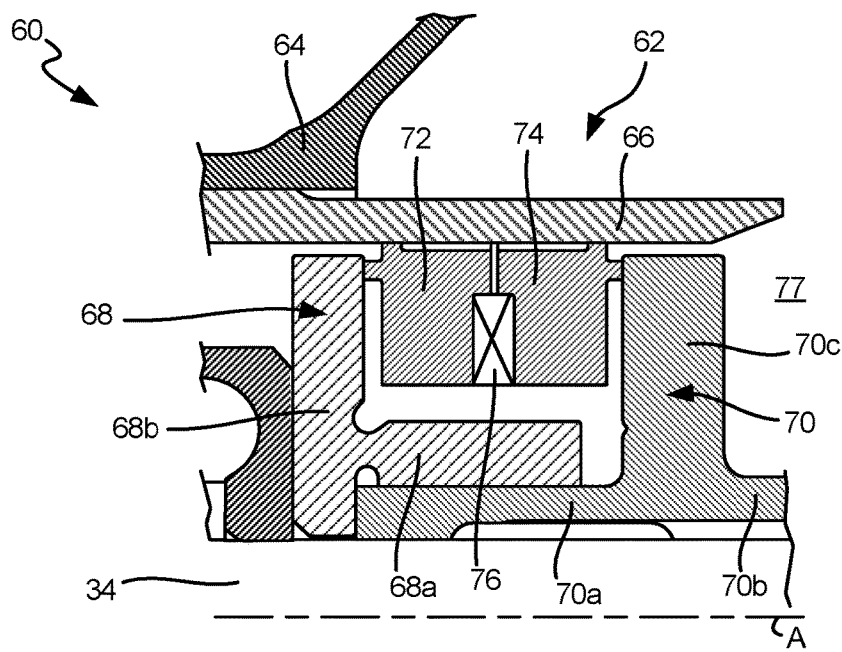
FIG. 2 is a cross-sectional view of a turbine exhaust section of the gas turbine engine of FIG. 1 showing a ring seal arrangement in a correct orientation.

FIG. 2 is a cross-sectional view of turbine exhaust section 60 of gas turbine engine 20 of FIG. 1 showing the ring seal arrangement 62 in a correct orientation. Shown in FIG. 2 is shaft 34 running along center axis A through turbine exhaust section 60. Within turbine exhaust section 60 is ring seal arrangement 62 and support 64. Ring seal arrangement 62 includes static liner 66, front spacer 68, rear spacer 70, forward ring seal 72, aft ring seal 74, and resilient member 76. Axially rearward of rear spacer 70 is lubricant compartment 77, which contains lubricant that is used for cooling and reducing component wear.

Static liner 66 is on a radially outer side of ring seal arrangement 62 and does not rotate relative to shaft 34 and the other components of ring seal arrangement 62. Static liner 66 is annular in shape and extends along center axis A of gas turbine engine 20. Static liner 66 is connected to support 64, which is radially outward from static liner 66, and provides structural support to ring seal arrangement 62. Static liner 66 can be constructed from any material, such as a metal, alloy, composite, or another material, and can include a coating or other features to protect against wear or other stresses within turbine exhaust section 60. Static liner 66 provides a sealing surface with both forward ring seal 72 and aft ring seal 74 to minimize air, lubricant, and/or other fluids from flowing between an area axially forward of front spacer 68 and lubricant compartment 77 axially rearward of rear spacer 70.

Front spacer 68 is radially inward from static liner 66 and axially forward of forward ring seal 72. Front spacer 68 is annular in shape about center axis A and configured to rotate with shaft 34 (i.e., front spacer 68 can be connected to shaft 34). Front spacer 68 can have a cross section that is L-shaped with axial member 68a extending rearward so as to be radially inward from forward ring seal 72 and aft ring seal 74 and radial member 68b extending radially outward to be axially forward from forward ring seal 72. Front spacer 68 is not in contact with static liner 66, but is in contact with and seals with forward ring seal 72. Front spacer 68 can have a variety of configurations and can be constructed from any material, such as a metal, alloy, composite, or another material, and can include a coating or other features to protect against wear or provide more complete sealing with forward ring seal 72.

Rear spacer 70 is radially inward from static liner 66 and axially reward of aft ring seal 74. Rear spacer 70 forms an axial forward boundary of lubricant compartment 77, which can contain a lubricant used to cool components of gas turbine engine 20. Rear spacer 70 is annular in shape about center axis A and configured to rotate with shaft 34 and front spacer 68 (i.e., rear spacer 70 can be connected to shaft 34 and/or front spacer 68). Rear spacer 70 can have a cross section that is inverted T-shaped with axial member 70a extending forward to as to be radially inward from axial member 68a of front spacer 68, forward ring seal 72, and aft ring seal 74. Rear spacer 70 can also have axial member 70b extending rearward along center axis A and radial member 70c extending radially outward to be axially rearward from aft ring seal 74. Rear spacer 70 is not in contact with static liner 66, but is in contact with and seals with aft ring seal 74. Rear spacer 70 can have a variety of configurations and can be constructed from any material, such as a metal, alloy, composite, or another material, and can include a coating or other features to protect against wear or provide more complete sealing with aft ring seal 74. Front spacer 68 and rear spacer 70 can be connected or otherwise attached to one another at axial member 68a of front spacer 68 and axial member 70a of rear spacer 70 so as to rotate in unison with each other and with shaft 34.

Forward ring seal 72 is radially inward from static liner 66 and axially rearward from front spacer 68. Forward ring seal 72 is annular in shape and provides two sealing surfaces: an axial sealing surface to seal forward ring seal 72 to front spacer 68 and a radial sealing surface to seal forward ring seal 72 to static liner 66. Forward ring seal 72 is sized so as to be radially adjacent to and in contact with static liner 66 while remaining radially outward and spaced from (i.e., not in contact with) axial member 68a of front spacer 68. Forward ring seal 72 is a ring seal that can be constructed from any material, such as a metal, rubber, alloy, composite, or another material, and can include a coating or other features to protect against wear and/or provide more complete sealing with static liner 66 and front spacer 68. Forward ring seal 72 has additional features that will be described with greater detail in regards to FIGS. 3A-5 that allow for better sealing, increased reliability, and installation foolproofing.

Aft ring seal 74 is similar in configuration to forward ring seal 72, except that aft ring seal 74 when installed in a correct orientation (as shown in FIG. 2) is faced in an opposite axial direction such that aft ring seal 74 has one sealing surface on an axial rearward side to seal aft ring seal 74 to rear spacer 70. Aft ring seal 74 has another sealing surface, a radial sealing surface, to seal aft ring seal 74 to static liner 66. Similar to forward ring seal 72, aft ring seal 74 is annular in shape and sized so as to be radially adjacent to and in contact with static liner 66 while remaining radially outward and spaced from (i.e., not in contact with) axial member 68a of front spacer 68. Aft ring seal 74 is a ring seal that can be constructed, for example, from metal, rubber, alloy, composite, or another material, and can include a coating or other features to protect against wear and/or provide more complete sealing with static liner 66 and rear spacer 70. Aft ring seal 74 has additional features that will be described with greater detail in regards to FIGS. 3A-5 that allow for better sealing, increased reliability, and installation foolproofing.

Resilient member 76 is axially between forward ring seal 72 and aft ring seal 74, biases forward ring seal 72 axially forward to remain adjacent to and in contact with front spacer 68, and biases aft ring seal 74 axially rearward to remain adjacent to and in contact with rear spacer 70. Resilient member 76 can fit within cutouts/indents in forward ring seal 72 and aft ring seal 74, or resilient member 76 can have another configurations. Resilient member 76 can be annular in shape extending completely or partially circumferentially around center axis A, or resilient member 76 can be one or a number of individual components spaced circumferentially around forward ring seal 72 and aft ring seal 74, such as rubber blocks, wave springs, or other types of springs. Resilient member 76 can have a variety of configurations and can be constructed from any material, such as a metal, alloy, composite, or another material, and can include a coating or other features to protect against wear. Resilient member 76 can be bonded or otherwise attached to forward ring seal 72 and aft ring seal 74, or resilient member 76 can just be held/squeezed in place between forward ring seal 72 and aft ring seal 74 due to the radially expanding character of resilient member 76.

Forward ring seal 72 and aft ring seal 74 can be configured to rotate along with shaft 34, front spacer 68, and rear spacer 70 or can be configured to be nonrotating or to rotate at a different speed than shaft 34, front spacer 68, and rear spacer 70. Ring seal arrangement 62 can also be configured to include only one ring seal or include more than two ring seals. Further, ring seal arrangement 62 can be located in another section of gas turbine engine 20 or in another machine that requires sealing.

When in the correct orientation as shown in FIG. 2, forward ring seal 72 and aft ring seal 74 provide sealing to limit air, lubricant, and/or other fluids from flowing between static liner 66, front spacer 68, and rear spacer 70. When in an incorrect orientation as shown in FIGS. 4A and 4B and as will be described in detail below, forward ring seal 72 and aft ring seal 74 experience increased axial loading and wear, which can cause damage to ring seal arrangement 62 and gas turbine engine 20 and reduce the product reliability. To prevent a mistake during installation of forward ring seal 72 and aft ring seal 74, each includes bleed slots on a surface opposite the axial sealing surface. The bleed slots, as will be described in detail with regards to FIGS. 3A-5, allow for air to flow through ring seal arrangement 62 during an air pressure leakage test when forward ring seal 72 and/or aft ring seal 74 are installed in the incorrect orientation. The air pressure leakage test is usually preformed before gas turbine engine 20 is put into operation.

Figure 3A:
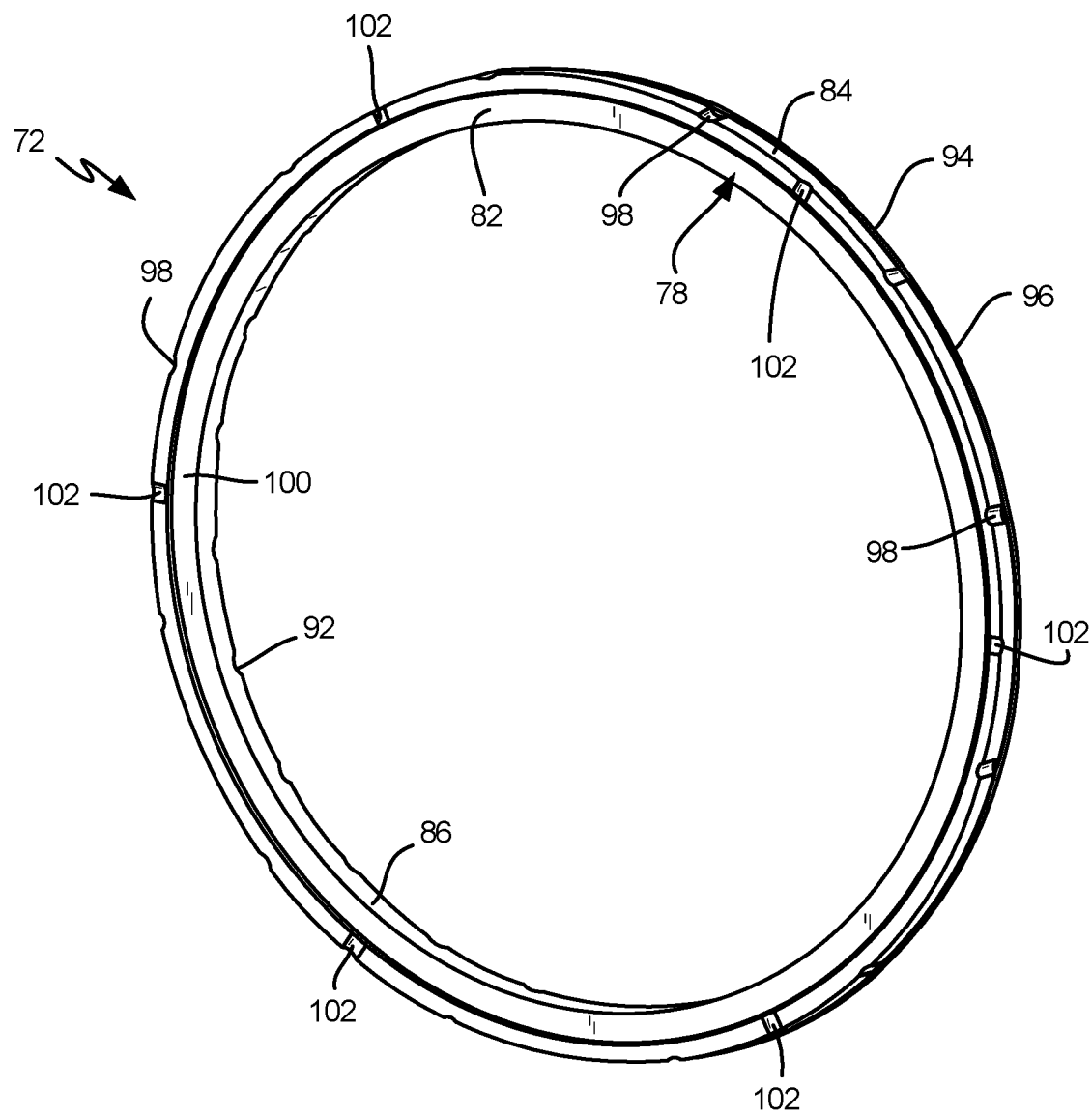
FIG. 3A is a perspective view of a ring seal of the ring seal arrangement of FIG. 2.
Figure 3B:
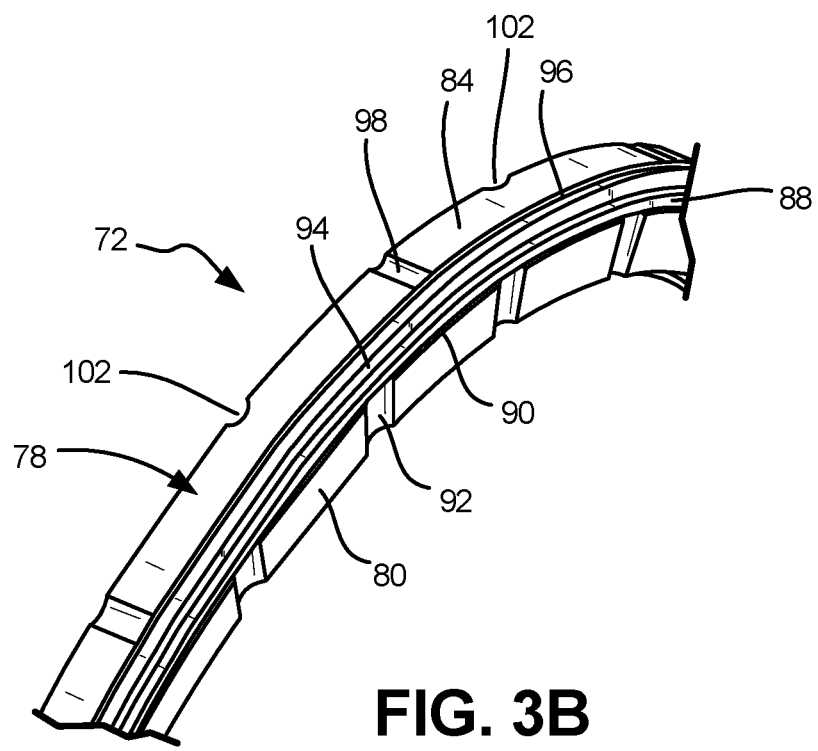
FIG. 3B is a first enlarged partial perspective view of the ring seal in FIG. 3A.
Figure 3C:
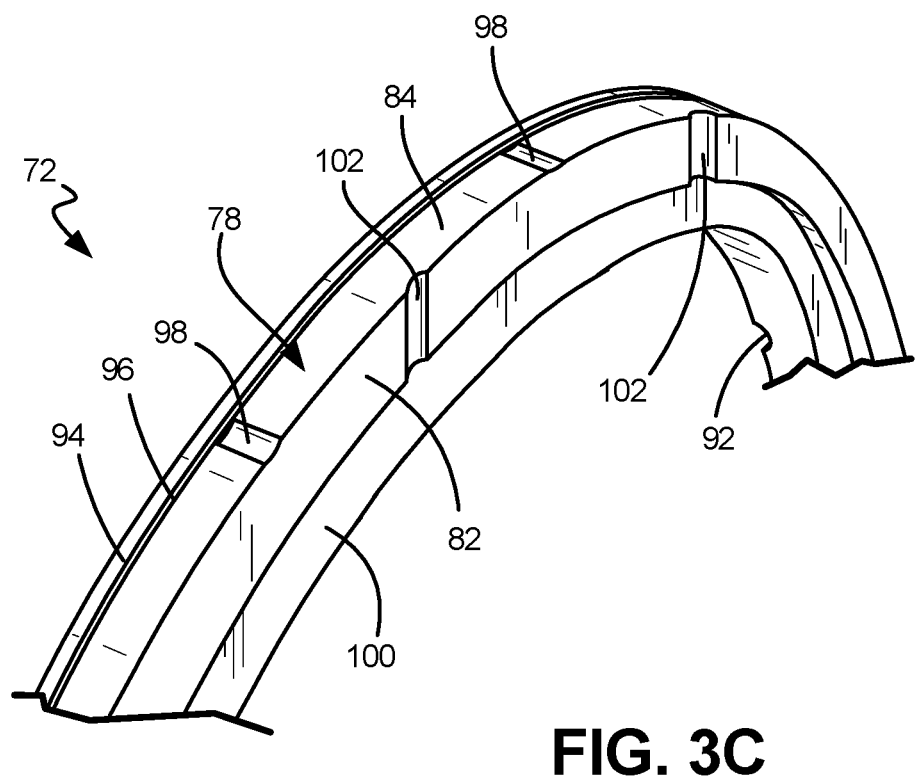
FIG. 3C is a second enlarged partial perspective view of the ring seal in FIG. 3A.
Figure 4A:
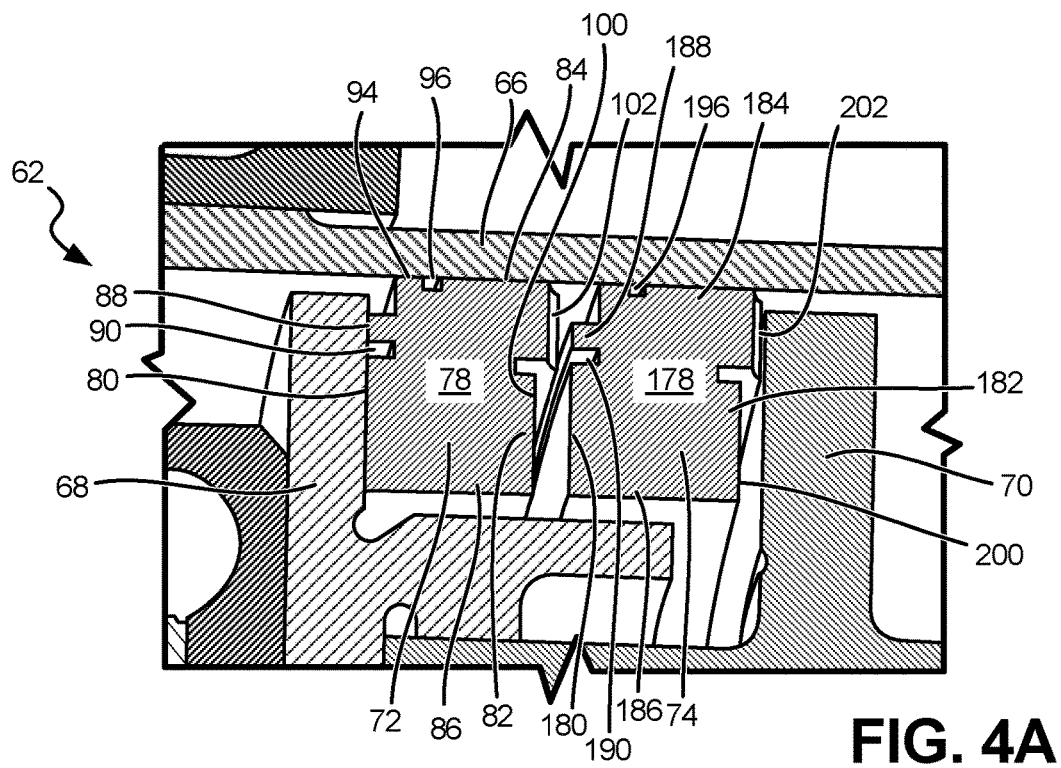
FIG. 4A is a partial perspective view of the ring seal arrangement with the aft ring seal incorrectly installed.
Figure 4B:
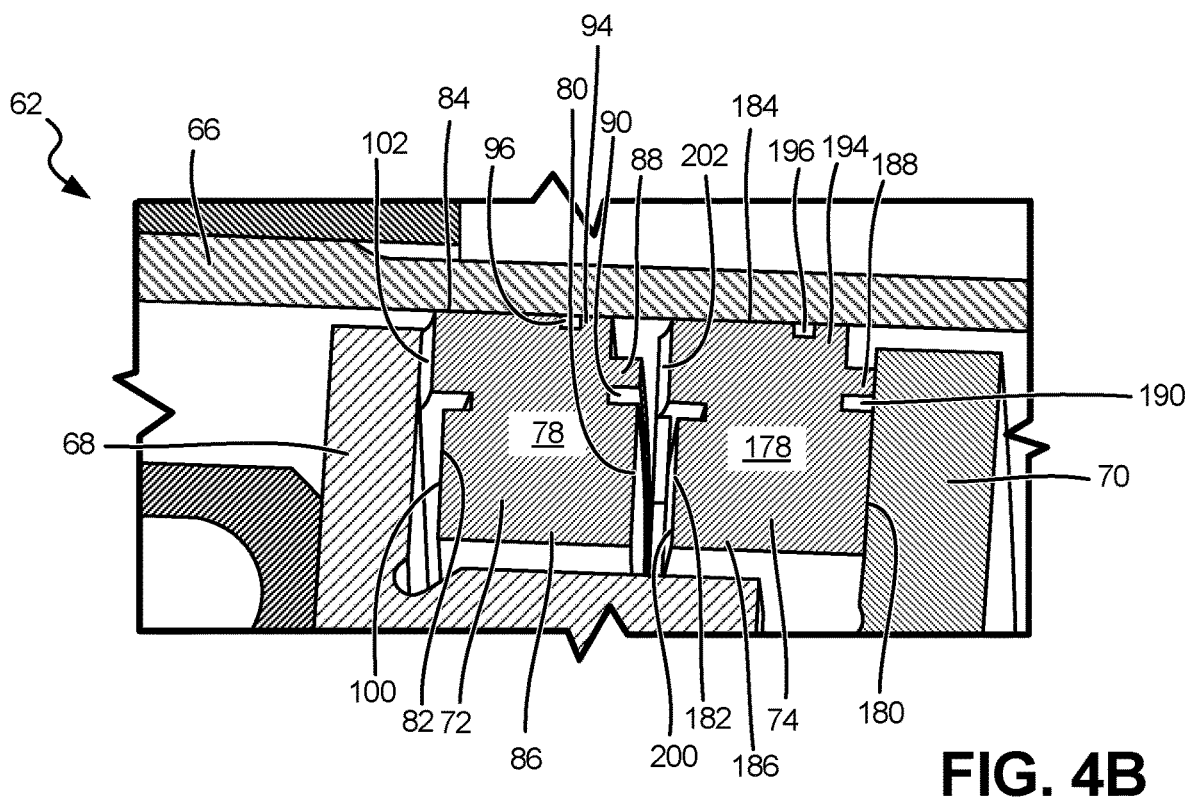
FIG. 4B is a partial perspective view of the ring seal arrangement with the forward ring seal incorrectly installed.

FIG. 3A is a perspective view of forward ring seal 72 of ring seal arrangement 62 in FIG. 2, FIG. 3B is a first enlarged partial perspective view of forward ring seal 72 in FIG. 3A, and FIG. 3C is a second enlarged partial perspective view of forward ring seal 72 in FIG. 3A. While forward ring seal 72 is described in FIGS. 3A-3C, forward ring seal 72 and aft ring seal 74 are identical with regards to structure, so any feature of forward ring seal 72 is also present in aft ring seal 74. However, when installed in the correct orientation, aft ring seal 74 is in an opposite orientation from forward ring seal 72 such that forward ring seal 72 and aft ring seal 74 mirror one another along a plane perpendicular to center axis A. Thus, for example, while forward ring seal 72 will be described as having an axial sealing dam on an axially forward side, this axial sealing dam is on an axially rearward side in aft ring seal 74 (when both ring seals are correctly installed).

Forward ring seal 72 includes ring seal body 78 with first axial side 80, second axial side 82, radially outer side 84, and radially inner side 86. First axial side 80 includes axial sealing dam 88 creating a first sealing surface, axial canal 90, and axial pressure balancing grooves 92. Radially outer side 84 includes radial sealing dam 94 creating a second sealing surface, radial canal 96, and radial pressure balancing grooves 98. Second axial side 82 includes cutout 100 and bleed slots 102.

Ring seal body 78 is the main structural component of forward ring seal 72. Ring seal body 78 is annular in shape and centered about center axis A of gas turbine engine 20. Ring seal body 78 has a generally rectangular cross section with various features/components that will be described below. While shown as having a generally rectangular cross section, ring seal body 78 can have other configurations to provide sealing and installation foolproofing in ring seal arrangement 62. Ring seal body 78 of forward ring seal 72 includes first axial side 80 on an axial forward side (adjacent front spacer 68 when installed correctly) and second axial side 82 on an axial rearward side (adjacent aft ring seal 74 and resilient member 76 when installed correctly). Ring seal body 78 also includes radially outer side 84 on a radially outer side (adjacent static liner 66) and radially inner side 86 on a radially inner side (radially outward from but not in contact with axial member 68a of front spacer 68).

Axial sealing dam 88 is on first axial side 80 of forward ring seal 72. Axial sealing dam 88 extends completely circumferential around forward ring seal 72 and forms a first sealing surface with front spacer 68 to limit air and/or other fluids from passing between forward ring seal 72 and front spacer 68. Axial sealing dam 88 is a flat surface on first axial side 80 between axial canal 90 and a radially outer edge of first axial side 80. Axial sealing dam 88 does not include any grooves, slots, or openings that would otherwise allow air or another fluid to easily pass between forward ring seal 72 and front spacer 68 and limit the effectiveness of the seal. Axial sealing dam 88 can be as narrow (i.e., extending in the radial direction) or wide as necessary to provide adequate sealing. However, axial sealing dam 88 in the disclosed embodiment is less than one-fourth of a radial width of first axial side 80 of forward ring seal 72. Further, while shown as closer to radially outer side 84 than to radially inner side 86, axial sealing dam 88 can be positioned anywhere radially along first axial side 80. Axial sealing dam 88 can be constructed from the same or a different material than the other features of forward ring seal 72, and axial sealing dam 88 can include a coating that provides better/more complete sealing with front spacer 68.

Axial canal 90 is a trench adjacent to and radially inward from axial sealing dam 88 on first axial side 80. Like axial sealing dam 88, axial canal 90 extends completely circumferential around forward ring seal 72 and, along with axial pressure balancing grooves 92, is configured to balance a pressure on first axial side 80. Axial pressure balancing grooves 92, which are grooves/slots that extend from radially inner side 86 to axial canal 90, are configured to convey pressurized air to axial canal 90 to balance the pressure of air around first axial side 80 to relieve stresses on axial sealing dam 88. Axial pressure balancing grooves 92 are referred to as such because axial pressure balancing grooves 92 are on first axial side 80 and balance pressure in an axial direction. Axial canal 90 and axial pressure balancing grooves 92 increase the durability and life cycle of forward ring seal 72 by reducing these stresses. Axial canal 90 can be as narrow (i.e., extending in the radial direction) or wide as necessary to aid in balancing the pressure on first axial side 80, and can be as deep as is necessary without compromising the structural integrity of forward ring seal 72. Similarly, axial pressure balancing grooves 92 can have any cross-sectional shape and can have any number spaced circumferentially around forward ring seal 72 to adequately provide pressurized air to axial canal 90. While forward ring seal 72 is shown to have axial canal 90 and axial pressure balancing grooves 92, other embodiments may include a configuration that does not include these features.

Radial sealing dam 94 is on radially outer side 84 of forward ring seal 72. Radial sealing dam 94 extends completely circumferentially around forward ring seal 72. Radial sealing dam 94 functions similarly to axial sealing dam 88 by forming a second sealing surface with static liner 66 to limit air and/or other fluids from passing between forward ring seal 72 and static liner 66. Radial sealing dam 94 is a flat surface on radially outer side 84 between radial canal 96 and an axially forward edge of radially outer side 84. Radial sealing dam 94 does not include any grooves, slots, or openings that would otherwise allow air or another fluid to easily pass between forward ring seal 72 and static liner 66 and limit the effectiveness of the seal. Radial sealing dam 94 can be as narrow (i.e., extending in the axial direction) or wide as necessary to provide adequate sealing. However, radial sealing dam 94 in the disclosed embodiment is less than one-fourth of an axial width of radially outer side 84 of forward ring seal 72. Further, while shown as closer to first axial side 80 than to second axial side 82, radial sealing dam 94 can be positioned anywhere axially along radial outer side 84. Radial sealing dam 94 can be constructed from the same or a different material than the other features of forward ring seal 72, and radial sealing dam 94 can include a coating that provides better/more complete sealing with static liner 66.

Radial canal 96 and radial pressure balancing grooves 98 have the same function and configuration as axial canal 90 and axial pressure balancing grooves 92, except that radial canal 96 and pressure balancing grooves 98 are configured to balance a pressure on radially outer side 84. Radial canal 96 is a trench adjacent to and axially rearward from radial sealing dam 94 on radially outer side 84. Radial canal 96 extends completely circumferentially around forward ring seal 72. Radial pressure balancing grooves 98, which are grooves/slots that extend from second axial side 82 to radial canal 96, are configured to convey pressurized air to radial canal 96 to balance the pressure of air around radially outer side 84 to relieve stresses on radial sealing dam 94. Radial pressure balancing grooves 98 are referred to as such because radial pressure balancing grooves 98 are on radially outer side 84 and balance pressure in a radial direction. Radial canal 96 and radial pressure balancing grooves 98 increase the durability and life cycle of forward ring seal 72 by reducing these stresses. Radial canal 96 can be as narrow (i.e., extending in the axial direction) or wide as necessary to aid in balancing the pressure on radial outer side 84, and can be as deep as is necessary without compromising the structural integrity of forward ring seal 72. Similarly, radial pressure balancing grooves 98 can have any cross-sectional shape and can have any number spaced circumferentially around forward ring seal 72 to adequately provide pressurized air to radial canal 96. While forward ring seal 72 is shown to have radial canal 96 and radial pressure balancing grooves 98, other embodiments may include a configuration that does not include these features.

A thickness of axial sealing dam 88 can be the same or different than a thickness of radial sealing dam 94, a thickness and/or depth of axial canal 90 can be the same or different than a thickness and/or depth of radial canal 96, and the cross-sectional area and number of axial pressure balancing grooves 92 can be the same or different than the cross-sectional area and number of radial pressure balancing grooves 98 depending on the sealing and pressure balancing needs of forward ring seal 72.

Cutout 100 is an indent/slot on second axial side 82 of forward ring seal 72. Cutout 100 provides an area into which at least a portion of resilient member 76 (shown in FIG. 2) extends and is held in place between forward ring seal 72 and aft ring seal 74. Cutout 100 can extend completely circumferentially around forward ring seal 72 (as shown in FIG. 3A) or can be one or a multiple indents/slots spaced circumferentially around forward ring seal 72 to accommodate one or multiple individual resilient members 76 spaced circumferentially around forward ring seal 72. Cutout 100 can be as deep (i.e., extending in the axial direction) or shallow as needed to accommodate at least a portion of resilient member 76. Further, cutout 100 can include an adhesive or another fastener to hold resilient member 76 in place relative to forward ring seal 72, or resilient member 76 can be held in place due to friction by being squeezed between forward ring seal 72 and aft ring seal 74. Other embodiments of forward ring seal 72 can include configurations in which cutout 100 is not present or in which other means are used to retain resilient member 76 between forward ring seal 72 and aft ring seal 74 (or resilient member 76 is not present within ring seal arrangement 62).

Bleed slots 102 are grooves/slots on second axial side 82 that extend from cutout 100 to radially outer side 84 (if cutout 100 is not present, then bleed slots 102 extend entirely radially across second axial side 82 from radially inner side 86 to radially outer side 84). Bleed slots 102 provide a passage that allows air to pass from radially inner side 86 to radially outer side 84. Bleed slots 102 can have any cross-sectional shape and can have any number spaced circumferentially around second axial side 82 of forward ring seal 72. The cross-sectional shape of bleed slots 102 in the disclosed embodiment is arced so as to be a partial circle. Further, as shown in FIG. 3A, bleed slots 102 include six grooves spaced circumferentially equidistant around forward ring seal 72. However, bleed slots 102 can have another shape, number, and/or spacing. As will be described below, bleed slots 102 should be sized and/or have enough slots/grooves (i.e., provide enough cross-sectional flow area) to allow for air to flow from radially inner side 86 to radially outer side 84 (or vice versa) to affect an air pressure leakage test when forward ring seal 72 and/or aft ring seal 74 are installed in the incorrect orientation during assembly of gas turbine engine 20. Bleed slots 102 can extend entirely in a radial direction or can angle, wind, or otherwise extend at least partially in a circumferential direction. The cross-sectional area of each bleed slot 102 can be the same or different from each other. Further, each groove of axial pressure balancing grooves 92 and each groove of radial pressure balancing grooves 98 can have a greater cross-sectional area than the cross-sectional area of each slot of bleed slots 102.

When forward ring seal 72 is installed in the correct orientation, bleed slots 102 on second axial side 82 of forward ring seal 72 face axially rearward (and the bleed slots of aft ring seal 74 would face axially forward because aft ring seal 74 is structurally identical to forward ring seal 72 but in an opposite orientation when installed correctly). In the correct orientation, an air flow through bleed slots 102 is limited because bleed slots 102 at radially outer side 84 are adjacent to and blocked by static liner 66. Thus, bleed slots 102 do not inhibit proper sealing along the first sealing surface formed by axial sealing dam 88 on first axial side 80 or along the second sealing surface formed by radial sealing dam 94 on radially outer side 84. However, as will be explained with regards to FIGS. 4A and 4B below, when forward ring seal 72 and/or aft ring seal 74 are installed in the incorrect orientation, bleed slots 102 allow air to pass through the bleed slots 102 such that ring seal arrangement 62 affects the air pressure leakage test, which in turn notifies maintenance and/or assembly personnel that the ring seal arrangement 62 is not properly assembled.

FIG. 4A is a partial perspective view of ring seal arrangement 62 with aft ring seal 74 incorrectly installed, and FIG. 4B is a partial perspective view of ring seal arrangement 62 with forward ring seal 72 incorrectly installed. Shown in FIGS. 4A and 4B is static liner 66, front spacer 68, rear spacer 70, forward ring seal 72, and aft ring seal 74. Forward ring seal 72 includes ring seal body 78 with first axial side 80, second axial side 82, radially outer side 84, and radially inner side 86. First axial side 82 includes axial sealing dam 88 creating a first sealing surface, axial canal 90, and axial pressure balancing grooves (not shown). Radially outer side 84 includes radial sealing dam 94 creating a second sealing surface, radial canal 96, and radial pressure balancing grooves (not shown). Second axial side 82 includes cutout 100 and bleed slots 102. Similarly to forward ring seal 72, aft ring seal 74 includes ring seal body 178 with first axial side 180, second axial side 182, radially outer side 184, and radially inner side 186. First axial side 182 includes axial sealing dam 188 creating a first sealing surface, axial canal 190, and axial pressure balancing grooves (not shown). Radially outer side 184 includes radial sealing dam 194 creating a second sealing surface, radial canal 196, and radial pressure balancing grooves (not shown). Second axial side 182 includes cutout 200 and bleed slots 202. The features/components of aft ring seal 74 as described in FIGS. 4A and 4B are similar to those features/components described with regards to forward ring seal 72 in FIGS. 3A-3C.

In FIG. 4A, aft ring seal 74 is installed in an incorrect orientation such that axial sealing dam 188 on the first sealing surface on first axial side 180 is not adjacent rear spacer 70 so cannot properly seal. Rather, in the incorrect orientation, bleed slots 202 on second axial side 182 are adjacent rear spacer 70, providing a passage through which air can easily flow such that ring seal arrangement 62 fails the air pressure leakage test. Without bleed slots 202, ring seal arrangement 62 with aft ring seal 74 in the incorrect orientation may still pass the air pressure leakage test due to the flat second axial side 182 providing at least some sealing with rear spacer 70. Thus, bleed slots 202 on aft ring seal 74 ensure ring seal arrangement 62 of gas turbine engine 20 does not go into operation with aft ring seal 74 in the incorrect orientation.

Forward ring seal 72 is installed in a correct orientation in FIG. 4A with axial sealing dam 88 on the first sealing surface on first axial side 80 adjacent to and forming a proper seal with front spacer 68 to limit air and/or other fluids from flowing from an area forward of front spacer 68 to an area radially inward and rearward of forward ring seal 72. In the correct orientation, bleed slots 102 in second axial side 82 of forward ring seal 72 are prevented from allowing air to flow by static liner 66, which blocks bleed slots 102 at radially outer side 84. While forward ring seal 72 individually would pass the air pressure leakage test when oriented as such in FIG. 4A, ring seal arrangement 62 as a whole would fail the air pressure leakage test due to the incorrect orientation of aft ring seal 74 and bleed slots 202 allowing air and/or other fluids to easily pass between aft ring seal 74 and rear spacer 70.

In FIG. 4B, aft ring seal 74 is in a correct orientation, but forward ring seal 72 is in an incorrect orientation such that axial sealing dam 88 forming the first sealing surface on first axial side 80 of forward ring seal 72 is not adjacent front spacer 68. Rather, in the incorrect orientation, bleed slots 102 on second axial side 82 of forward ring seal 72 are adjacent front spacer 68, providing a passage through which air can easily flow such that ring seal arrangement 62. Forward ring seal 72 in an incorrect orientation increases axial loading and wear, which can cause damage to forward ring seal 72 and reduce the reliability of ring seal arrangement 62. Thus, installation of both forward ring seal 72 and aft ring seal 72 in a correct orientation is important.

Aft ring seal 74 is installed in a correct orientation in FIG. 4B with axial sealing dam 188 on the first sealing surface on first axial side 180 adjacent to and forming a proper seal with rear spacer 70 to limit air and/or other fluids from flowing from an area rearward of rear spacer 70 (such as lubricant compartment 77) to an area radially inward and forward of aft ring seal 74. In the correct orientation, bleed slots 202 in second axial side 182 of aft ring seal 74 are prevented from allowing air to flow by static liner 66, which blocks bleed slots 202 at radially outer side 184.

Figure 5:
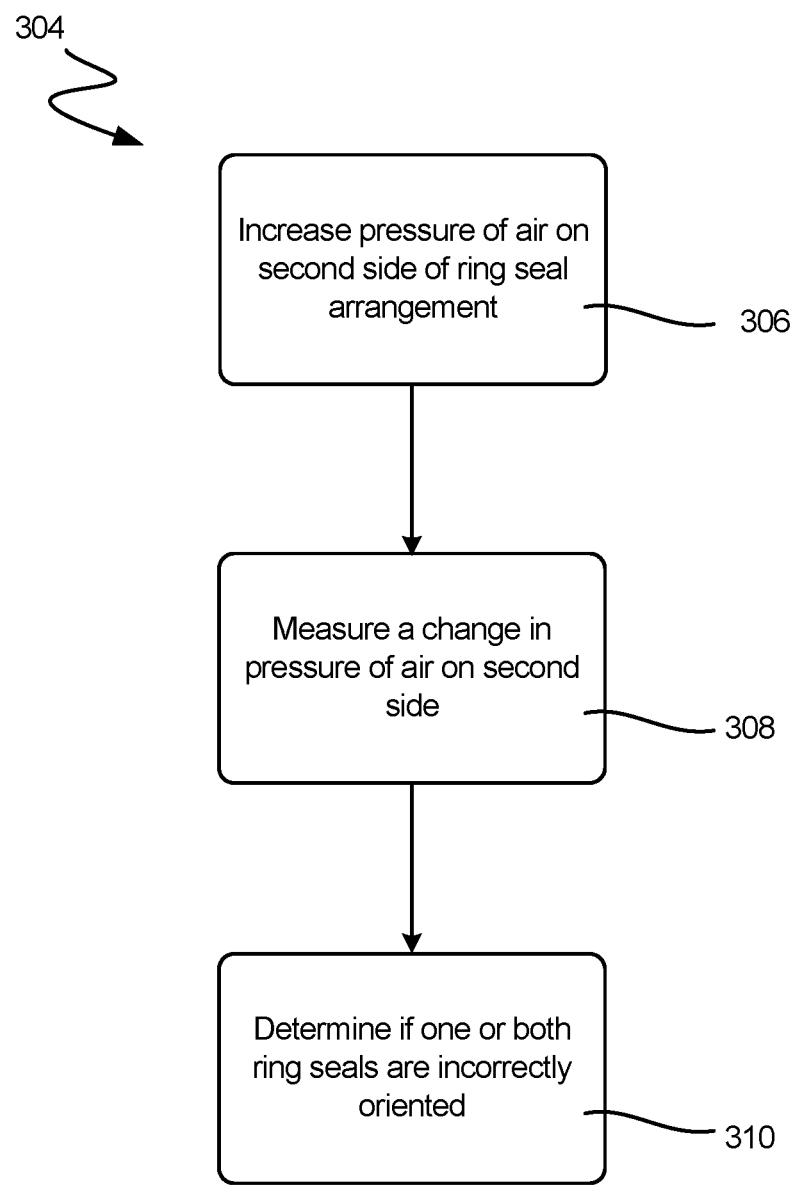
FIG. 5 is a flow chart of an air pressure leakage test.

FIG. 5 is a flow chart of air pressure leakage test 304 as it may be performed on ring seal arrangement 62 of gas turbine engine 20. The method of testing ring seal arrangement 62 is performed after ring seal arrangement 62 has been assembled such that forward ring seal 72 and aft ring seal 74 are in place between static liner 66, front spacer 68, and rear spacer 70. However, to determine if one or both of forward ring seal 72 and aft ring seal 74 are in the incorrect orientation, the method of testing ring seal arrangement 62 using air pressure leakage test 304 is performed.

The first step 306 of air pressure leakage test 304 is to increase a pressure of air on either the front spacer 68 side or the rear spacer 70 side of ring seal arrangement 62. The increase in pressure can be provided by components and/or systems already within gas turbine engine 20 or by external systems, and the increase in pressure can be within lubricant compartment 77. The increase in pressure puts stress on forward ring seal 72 and aft ring seal 74.

The second step 308 of air pressure leakage test 304 is to measure a change in pressure of air on either the front spacer 68 side or the rear spacer 70 side of ring seal arrangement 62. The measurement of the change in air pressure determines how much air is flowing through ring seal arrangement 62. Specifically, it is a measurement of how much air is flowing between front spacer 68 and forward ring seal 72 and between rear spacer 70 and aft ring seal 74. The pressure can be measured on either side independent of which side the pressure is increased on during first step 306. For example, if the pressure is increased on the rear spacer 70 side (i.e., within lubricant compartment 77) in first step 306, then the change in pressure can be measured either on the rear spacer 70 side, which will exhibit a decrease in pressure, or on the front spacer 68 side, which will exhibit an increase in pressure.

The third step 310 of air pressure leakage test 304 is to determine if one or both of forward ring seal 72 and aft ring seal 74 are in the incorrect orientation based on the change in the pressure of air as measured on either the front spacer 68 side or the rear spacer 70 side. If one or both of forward ring seal 72 and aft ring seal 74 are in the incorrect orientation, the change in air pressure will be greater than if both are in the correct orientation. The change in air pressure will be greater in the incorrect orientation because bleed slots 102 of forward ring seal 72 will allow a greater amount of air to flow between front spacer 68 and forward ring seal 72 than if axial sealing dam 88 of forward ring seal 72 is adjacent to and sealing with front spacer 68, and because bleed slots 202 of aft ring seal 74 will allow a greater amount of air to flow between rear spacer 70 and aft ring seal 74 than if axial sealing dam 188 of aft ring seal 74 is adjacent to and sealing with rear spacer 70. Thus, an installation of forward ring seal 72 and/or aft ring seal 74 that is in the incorrect orientation can be determined during air pressure leakage test 304, which can be performed before gas turbine engine 20 is put into operation.

Ring seal arrangement 62 with foolproofing capabilities (bleed slots 102 of forward ring seal 72 and bleed slots 202 of aft ring seal 74) in gas turbine engine 20 includes bleed slots 102/202 that extend through ring seal 72/74 to allow air to pass through ring seal arrangement 62 if ring seal 72/74 is installed in an incorrect orientation, thus allowing ring seal arrangement 62 to fail air leakage pressure test 306 during the assembly process and before ring seal arrangement 62 is put into operation. Because of the geometry of ring seal 72/74, air pressure leakage test 306 would not reveal that ring seal 72/74 is in the incorrect orientation (i.e., incorrectly installed) without the foolproofing bleed slots 102/202. Without bleed slots 102/202, an incorrectly oriented ring seal 72/74 could end up in operation of gas turbine engine 20, which would result in increased seal wear, a shorter life cycle, and reduced product reliability.

Discussion of Possible Embodiments

The following are non-exclusive descriptions of possible embodiments of the present invention.

A ring seal for sealing between components in a gas turbine engine includes a ring seal body, an axial sealing dam, a radial sealing dam, and at least one bleed slot. The ring seal body is annular in shape and has a first axial side, a second axial side, a radially outer side, and a radially inner side. The axial sealing dam is on the first axial side and is configured to provide a first sealing surface between the ring seal and a first component. The radial sealing dam is on the radially outer side and is configured to provide a second sealing surface between the ring seal and a second component radially outward from the radially outer side. The at least one bleed slot is on the second axial side and configured to allow air to pass through the at least one bleed slot when the ring seal is incorrectly oriented such that the at least one bleed slot is adjacent to the first component.

The ring seal of the preceding paragraph can optionally include, additionally and/or alternatively, any one or more of the following features, configurations and/or additional components:

The at least one bleed slot includes at least six bleed slots.

A cutout on the second axial side extends from the radially inner side to a point distant from the radially outer side, and the at least one bleed slot extends radially from the cutout to the radially outer side.

The cutout extends circumferentially around an entirety of the ring seal body.

The cutout is configured to accommodate at least a portion of a resilient member.

An axial canal on the first axial side adjacent to the axial sealing dam, at least one axial pressure balancing groove on the first axial side extends from the radially inner side to the axial canal, a radial canal on the radially outer side is adjacent to the radial sealing dam, and at least one radial pressure balancing groove on the radially outer side extends from the second axial side to the radial canal.

Each groove of the at least one axial pressure balancing groove and each groove of the at least one radial pressure balancing groove have a greater cross-sectional area than a cross-sectional area of each slot of the at least one bleed slot.

The at least one bleed slot has a cross-sectional shape that is arc-shaped.

The at least one bleed slot has a cross-sectional area that is sufficiently large to allow the ring seal to fail a leakage test by allowing fluid to pass through the at least one bleed slot when the at least one bleed slot is adjacent to the first component.

A ring seal arrangement includes a static liner, a front spacer, a rear spacer, a forward ring seal, an aft ring seal, and a resilient member. The static liner is annular in shape, extends axially along a center axis, and is configured to be nonrotatable. The front spacer is radially inward from the static liner and is configured to be rotatable relative to the static liner. The rear spacer is radially inward from the static liner, axially downstream from the front spacer, and configured to be rotatable relative to the static liner. The forward ring seal is annular in shape with a forward sealing dam adjacent to the front spacer, an outer sealing dam adjacent to the static liner, and at least one bleed slot on an aft side with the at least one bleed slot configured to allow air to flow between the front spacer and the forward ring seal when the forward ring seal is installed in an incorrect orientation when the aft side is adjacent to the forward spacer. The aft ring seal is annular in shape with a rear sealing dam adjacent to the rear spacer, an outer sealing dam adjacent to the static liner, and at least one bleed slot on a forward side with the at least one bleed slot configured to allow air to flow between the rear spacer and the aft ring seal when the aft ring seal is installed in an incorrect orientation when the forward side is adjacent to the rear spacer. The resilient member is positioned between the forward ring seal and the aft ring seal.

The ring seal arrangement of the preceding paragraph can optionally include, additionally and/or alternatively, any one or more of the following features, configurations and/or additional components:

The at least one bleed slot in the forward ring seal and the at least one bleed slot in the aft ring seal both extend entirely in a radial direction.

A first cutout in the aft side of the forward ring seal is configured to be adjacent to the resilient member when installed in a correct orientation, and wherein the at least one bleed slot in the forward ring seal extends from the first cutout to a radially outer side of the forward ring seal.

A second cutout in the forward side of the aft ring seal is configured to be adjacent to the resilient member when installed in the correct orientation, and wherein the at least one bleed slot in the aft ring seal extends from the second cutout to a radially outer side of the aft ring seal.

The rear spacer is one component of a lubricant containment system.

The forward ring seal fails a leakage test by allowing an excessive amount of fluid to flow between the front spacer and the forward ring seal when installed in the incorrect orientation.

The aft ring seal fails a leakage test by allowing an excessive amount of fluid to flow between the rear spacer and the aft ring seal when installed in the incorrect orientation.

The forward ring seal and the aft ring seal are identical in structural configuration.

A shaft radially inward from the front spacer, the rear spacer, the forward ring seal, and the aft ring seal with the shaft configured to be rotatable along with the front spacer and the rear spacer.

A method of testing a ring seal arrangement having a first side and a second side includes increasing a pressure of air on the second side of the ring seal arrangement to be greater than a pressure of air on the first side of the ring seal arrangement. The ring seal arrangement includes a forward ring seal configured to form a seal with the first side and having at least one bleed slot configured to allow air to flow between the first side and the second side when the forward ring seal is installed in an incorrect orientation and an aft ring seal configured to form a seal with the second side and having at least one bleed slot configured to allow air to flow between the first side and the second side when the aft ring seal is installed in an incorrect orientation. The method also includes measuring a change in pressure of air on the second side of the ring seal arrangement, and determining if one or both of the forward ring seal and the aft ring seal is in the incorrect orientation based on the change in pressure of air on the second side of the ring seal arrangement.

The method of the preceding paragraph can optionally include, additionally and/or alternatively, any one or more of the following features, configurations, steps, and/or additional components:

The at least one bleed slot of the forward ring seal is adjacent to the first side of the ring seal arrangement when in the incorrect orientation and the at least one bleed slot of the aft ring seal is adjacent the second side of the ring seal arrangement when in the incorrect orientation.

The change in pressure of air on the second side of the ring seal arrangement is less when a sealing surface of the forward ring seal is adjacent the first side and a sealing surface of the aft ring seal is adjacent the second side than when the at least one bleed slot of the forward ring seal is adjacent the first side and the at least one bleed slot of the aft ring seal is adjacent the second side.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A ring seal for sealing between components in a gas turbine engine, the ring seal comprising: a ring seal body that is annular in shape with a first axial side, a second axial side, a radially outer side, and a radially inner side; an axial sealing dam on the first axial side configured to provide a first sealing surface between the ring seal and a first component; a radial sealing dam on the radially outer side configured to provide a second sealing surface between the ring seal and a second component radially outward from the radially outer side; and at least one bleed slot extending completely across a thickened portion of the second axial side on the second axial side extending completely across the second axial side between the radially outer side and the radially inner side and configured to allow fluid to pass between the radially outer side and the radially inner side when the ring seal is incorrectly oriented such that the at least one bleed slot is adjacent to the first component.

2. The ring seal of claim 1, wherein the at least one bleed slot includes at least six bleed slots.

3. The ring seal of claim 1, further comprising: a cutout on the second axial side forming a thinner portion of the second axial side, the cutout extending from the radially inner side to a point distant from the radially outer side, wherein the at least one bleed slot extends radially from the cutout to the radially outer side.

4. The ring seal of claim 3, wherein the cutout extends circumferentially around an entirety of the ring seal body.

5. The ring seal of claim 3, wherein the cutout is configured to accommodate at least a portion of a resilient member.

6. The ring seal of claim 1, further comprising:
an axial canal on the first axial side adjacent to the axial sealing dam;
at least one axial pressure balancing groove on the first axial side extending from the radially inner side to the axial canal;
a radial canal on the radially outer side adjacent to the radial sealing dam; and
at least one radial pressure balancing groove on the radially outer side extending from the second axial side to the radial canal.

7. The ring seal of claim 6, wherein each groove of the at least one axial pressure balancing groove and each groove of the at least one radial pressure balancing groove have a greater cross-sectional area than a cross-sectional area of each slot of the at least one bleed slot.

8. The ring seal of claim 1, wherein the at least one bleed slot has a cross-sectional shape that is arc-shaped.

9. The ring seal of claim 1, wherein the at least one bleed slot has a cross-sectional area that is sufficiently large to allow the ring seal to fail a leakage test by allowing fluid to pass through the at least one bleed slot when the at least one bleed slot is adjacent to the first component.

10. A ring seal arrangement comprising: a static liner that is annular in shape and extends axially along a center axis, the static liner being configured to be nonrotatable; a front spacer radially inward from the static liner, the front spacer being configured to be rotatable relative to the static liner; a rear spacer radially inward from the static liner and axially downstream from the front spacer, the rear spacer being configured to be rotatable relative to the static liner; a forward ring seal that is annular in shape with a forward sealing dam adjacent to the front spacer, an outer sealing dam adjacent to the static liner, and at least one bleed slot extending completely across a thickened portion of an aft side, the at least one bleed slot extending completely across the forward ring seal between the static liner and front spacer and configured to allow fluid to flow between the front spacer and the forward ring seal when the forward ring seal is installed in an incorrect orientation when the aft side is adjacent to the forward spacer; an aft ring seal that is annular in shape with a rear sealing dam adjacent to the rear spacer, an outer sealing dam adjacent to the static liner, and at least one bleed slot extending completely across a thickened portion of a forward side, the at least one bleed slot extending completely across the aft ring seal between the static liner and rear spacer and configured to allow fluid to flow between the rear spacer and the aft ring seal when the aft ring seal is installed in an incorrect orientation when the forward side is adjacent to the rear spacer; and resilient member between the forward ring seal and the aft ring seal.

11. The ring seal arrangement of claim 10, wherein the at least one bleed slot in the forward ring seal and the at least one bleed slot in the aft ring seal both extend entirely in a radial direction.

12. The ring seal arrangement of claim 10, further comprising: a first cutout in the aft side of the forward ring seal forming a thinner portion of the aft side, the first cutout that is configured to be adjacent to the resilient member when installed in a correct orientation, wherein the at least one bleed slot in the forward ring seal extends from the first cutout to a radially outer side of the forward ring seal; and a second cutout in the forward side of the aft ring seal forming a thinner portion of the forward side, the second cutout that is configured to be adjacent to the resilient member when installed in the correct orientation, wherein the at least one bleed slot in the aft ring seal extends from the second cutout to a radially outer side of the aft ring seal.

13. The ring seal arrangement of claim 10, wherein the rear spacer is one component of a lubricant containment system.

14. The ring seal arrangement of claim 10, wherein the forward ring seal fails a leakage test by allowing an excessive amount of fluid to flow between the front spacer and the forward ring seal when installed in the incorrect orientation.

15. The ring seal arrangement of claim 10, wherein the aft ring seal fails a leakage test by allowing an excessive amount of fluid to flow between the rear spacer and the aft ring seal when installed in the incorrect orientation.

16. The ring seal arrangement of claim 10, wherein the forward ring seal and the aft ring seal are identical in structural configuration.

17. The ring seal arrangement of claim 10, further comprising:
a shaft radially inward from the front spacer, the rear spacer, the forward ring seal, and the aft ring seal, the shaft configured to be rotatable along with the front spacer and the rear spacer.

18. A method of testing a ring seal arrangement having a first side and a second side, the method comprising: increasing a pressure of air on the second side of the ring seal arrangement to be greater than a pressure of air on the first side of the ring seal arrangement with the ring seal arrangement including a forward ring seal configured to form a seal with the first side and having at least one bleed slot extending completely across a thickened portion of the forward ring seal between the first side and the second side to allow air to flow between the first side and the second side when the forward ring seal is installed in an incorrect orientation and an aft ring seal configured to form a seal with the second side and having at least one bleed slot extending completely across a thickened portion of configured to form a flow path extending completely across the aft ring seal between the first side and the second side to allow air to flow between the first side and the second side when the aft ring seal is installed in an incorrect orientation; measuring a change in pressure of air on the second side of the ring seal arrangement; and determining if one or both of the forward ring seal and the aft ring seal is in the incorrect orientation based on the change in pressure of air on the second side of the ring seal arrangement.

19. The method of claim 18, wherein the at least one bleed slot of the forward ring seal is adjacent to the first side of the ring seal arrangement when in the incorrect orientation and the at least one bleed slot of the aft ring seal is adjacent the second side of the ring seal arrangement when in the incorrect orientation.

20. The method of claim 18, wherein the change in pressure of air on the second side of the ring seal arrangement is less when a sealing surface of the forward ring seal is adjacent the first side and a sealing surface of the aft ring seal is adjacent the second side than when the at least one bleed slot of the forward ring seal is adjacent the first side and the at least one bleed slot of the aft ring seal is adjacent the second side.

\* \* \* \* \*